(12) United States Patent
Jarrett et al.

(10) Patent No.: US 6,325,952 B1
(45) Date of Patent: Dec. 4, 2001

(54) CONTINUOUS GASKET MAKING MACHINE AND METHOD

(76) Inventors: James K. Jarrett, 369 Creekside Way, Kaysville, UT (US) 84037; Michael A. Rathbone, 397 W 5300 S, Ogden, UT (US) 84405

( * ) Notice: Subject to any disclaimer, the term of this patent is extended or adjusted under 35 U.S.C. 154(b) by 0 days.

(21) Appl. No.: 09/443,124

(22) Filed: Nov. 18, 1999

Related U.S. Application Data

(60) Provisional application No. 60/119,307, filed on Feb. 8, 1999.

(51) Int. Cl.[7] .............................. B23D 25/02; B26D 1/56; B26D 7/06; B29B 17/00
(52) U.S. Cl. .................................. 264/37.3; 83/23; 83/24; 83/37; 83/167; 83/343; 83/401; 83/505; 83/659; 264/153; 425/298
(58) Field of Search .................................. 264/37.3, 153; 425/298, 302.1; 83/23, 24, 37, 167, 343, 401, 505, 659

(56) References Cited

U.S. PATENT DOCUMENTS

| | | |
|---|---|---|
| 2,692,020 | 10/1954 | Oberhardt . |
| 3,701,275 | 10/1972 | Overway et al. . |
| 3,801,406 | 4/1974 | Debenedetti . |
| 5,019,314 | 5/1991 | Burlando . |
| 5,346,664 | 9/1994 | Lenson . |
| 5,437,828 | 8/1995 | Shimizu et al. . |

*Primary Examiner*—Leo B. Tentoni
(74) *Attorney, Agent, or Firm*—Norton R. Townsley

(57) ABSTRACT

A machine for continuously making gaskets and similar flat products. Sheet gasket material is fed from a roll and through tooling that successively: cuts the outline, separates the center scrap, then separates the gaskets from the remaining sheet stock waste. The cutting tool rotates. The center scrap and the gaskets may be removed by rotating tooling or by vacuum and air pressure, respectively. Design and fabrication of such a machine, especially the cutting roller, is made possible by state of the art CAD software.

26 Claims, 12 Drawing Sheets

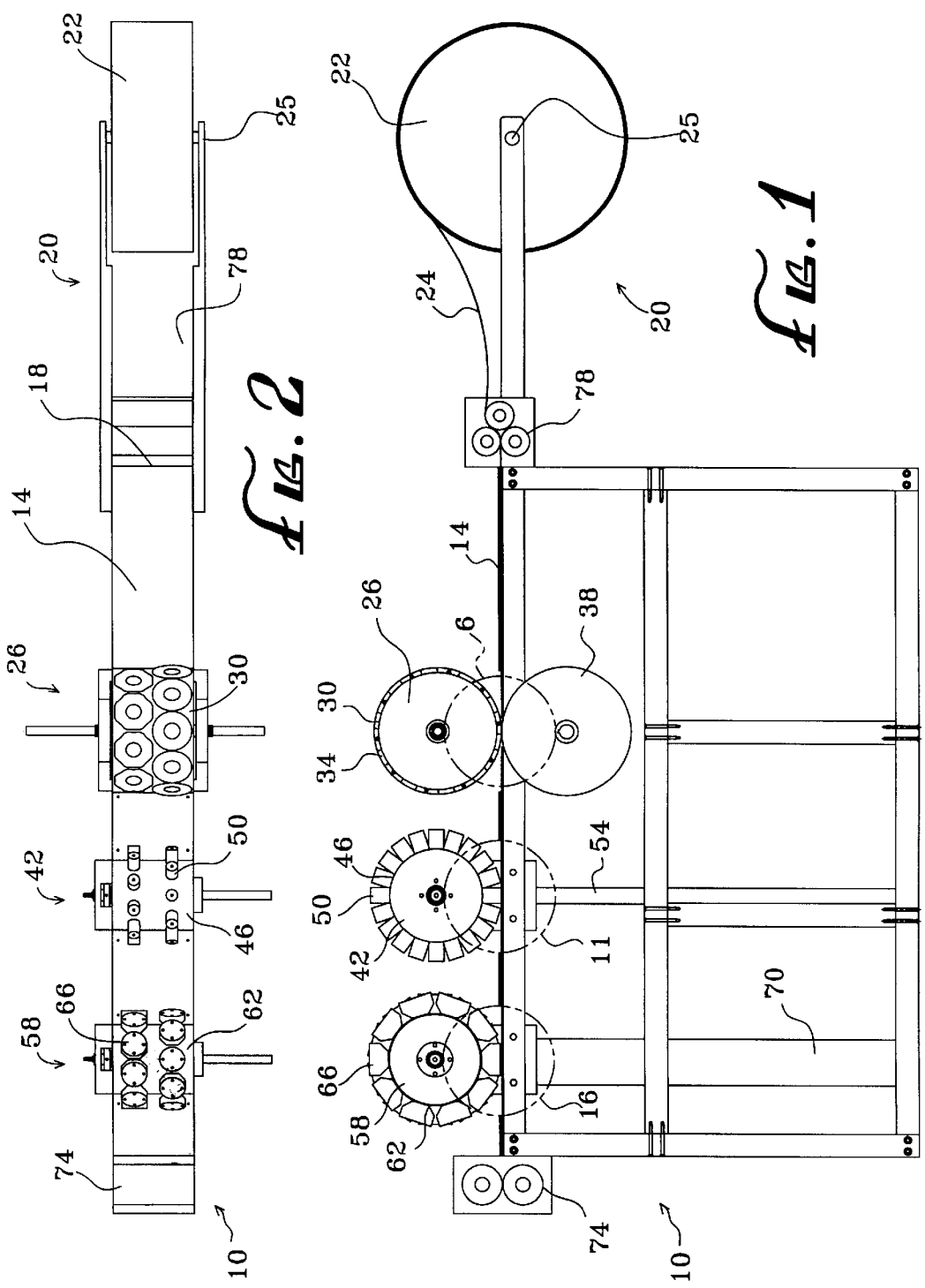

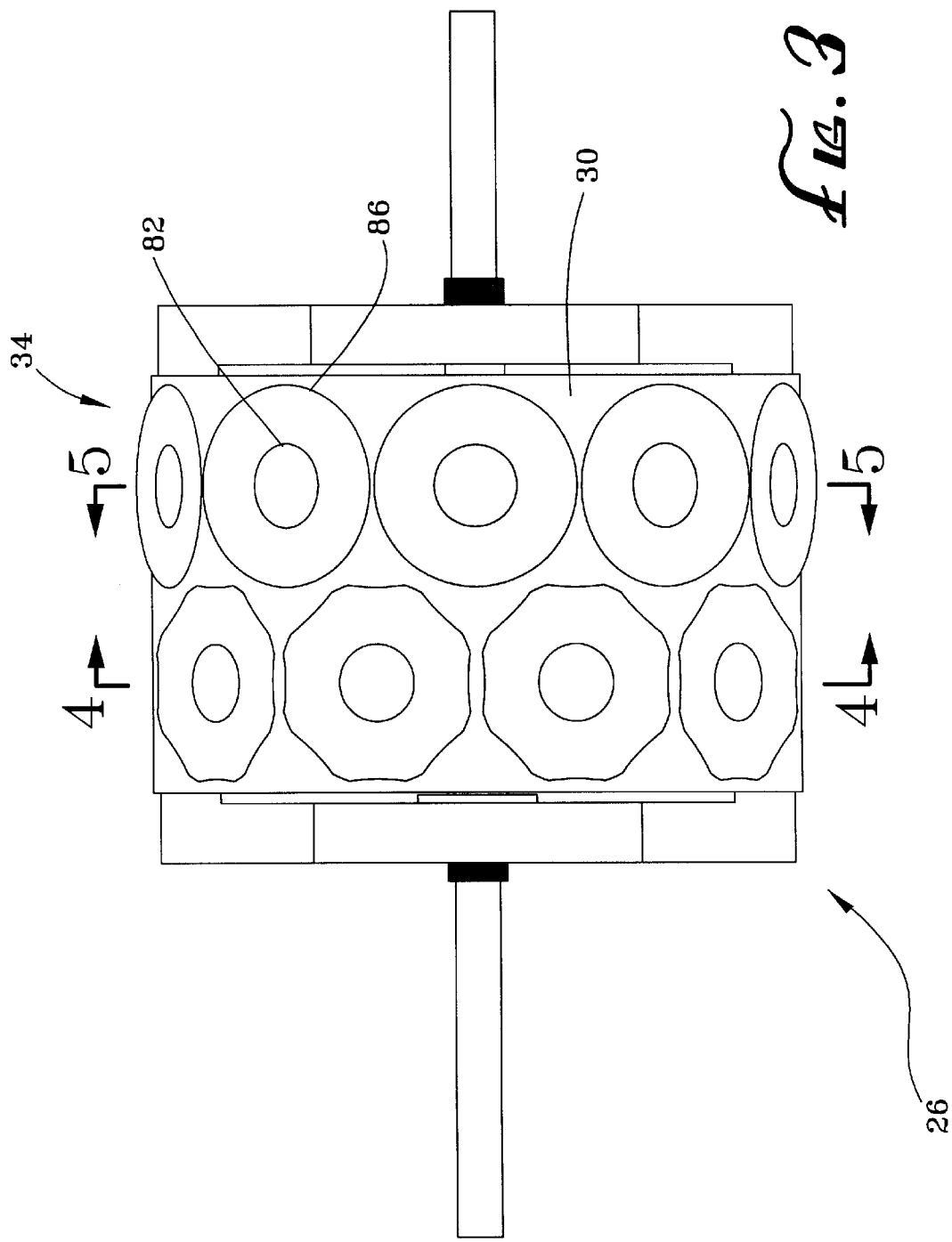

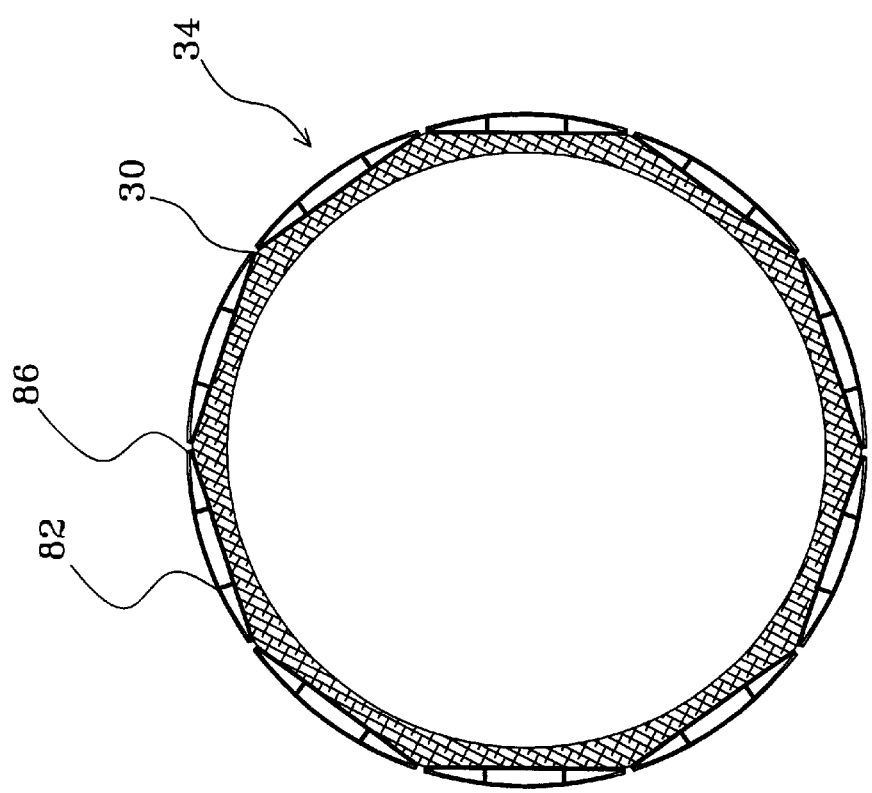
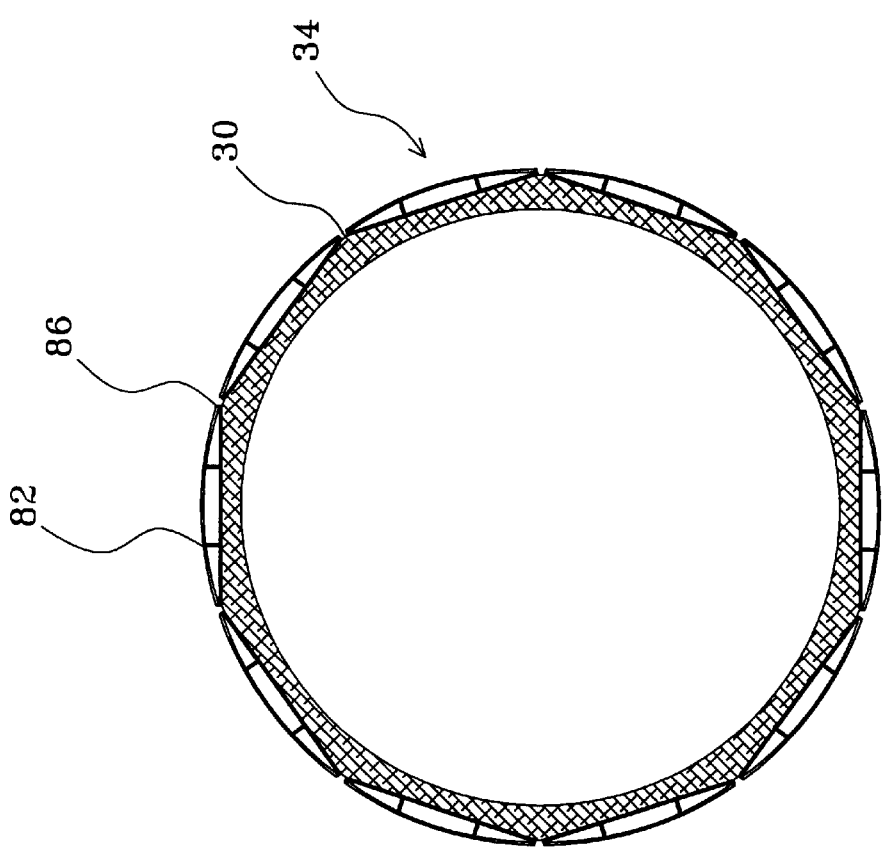

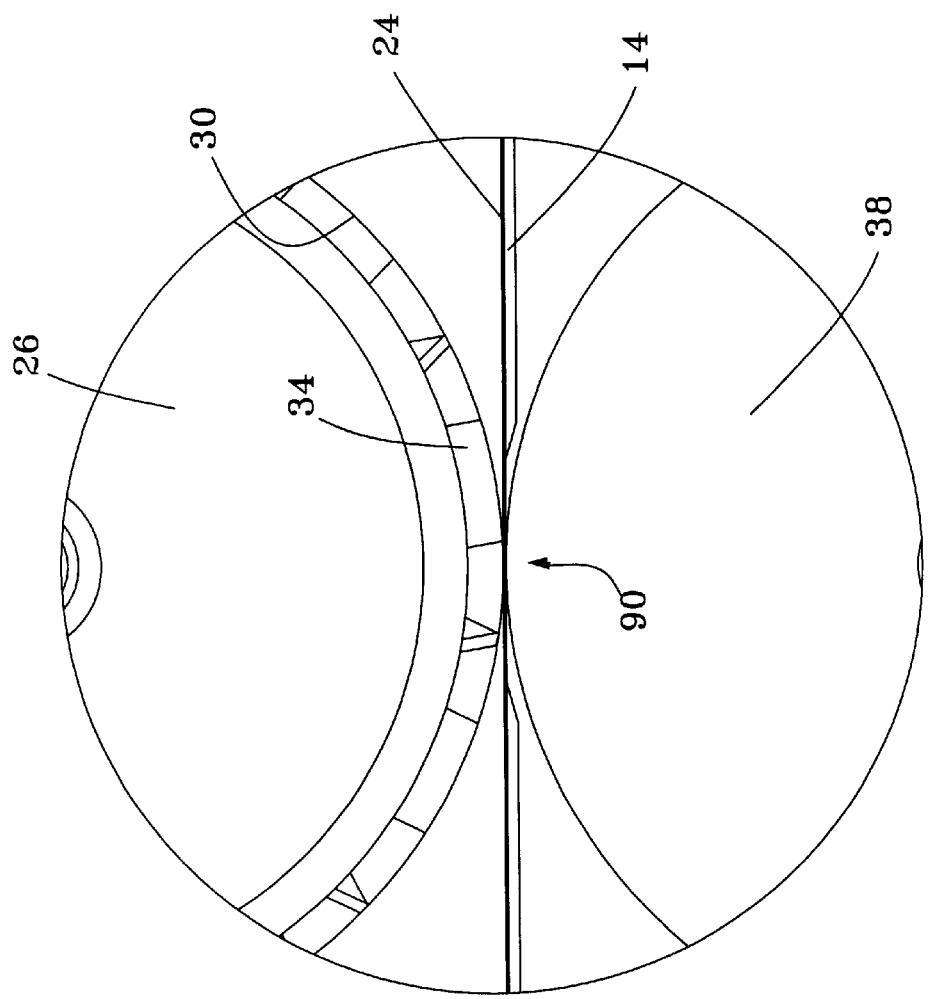

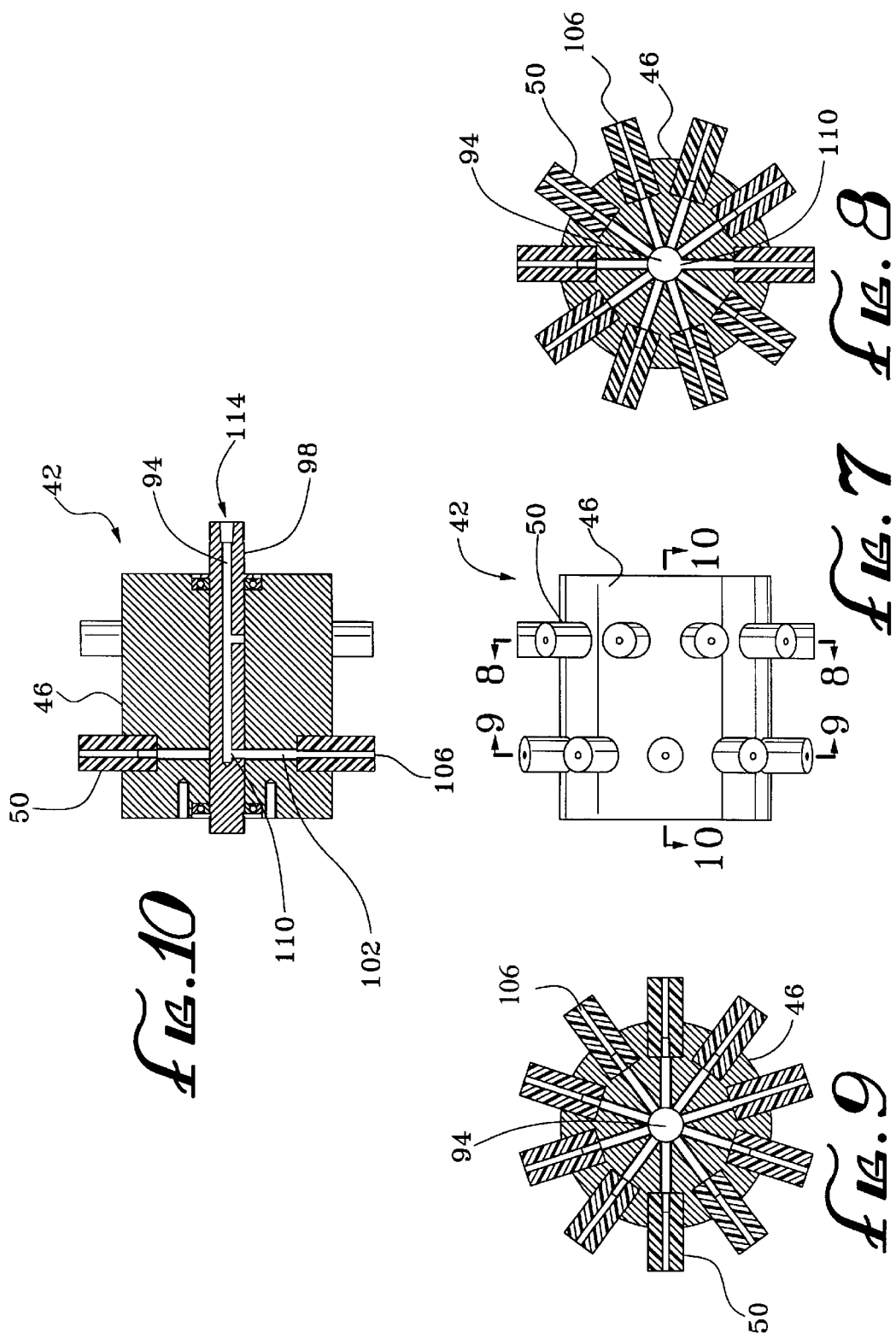

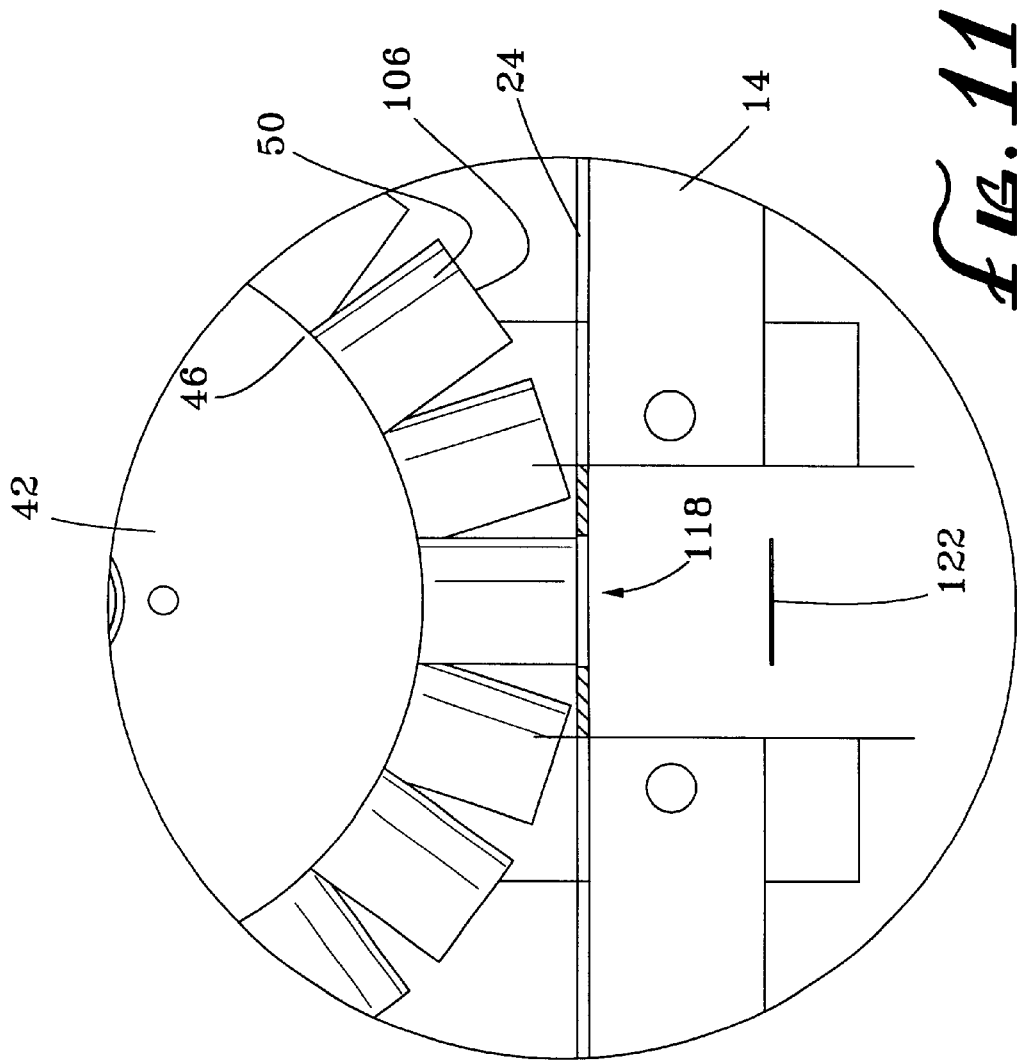

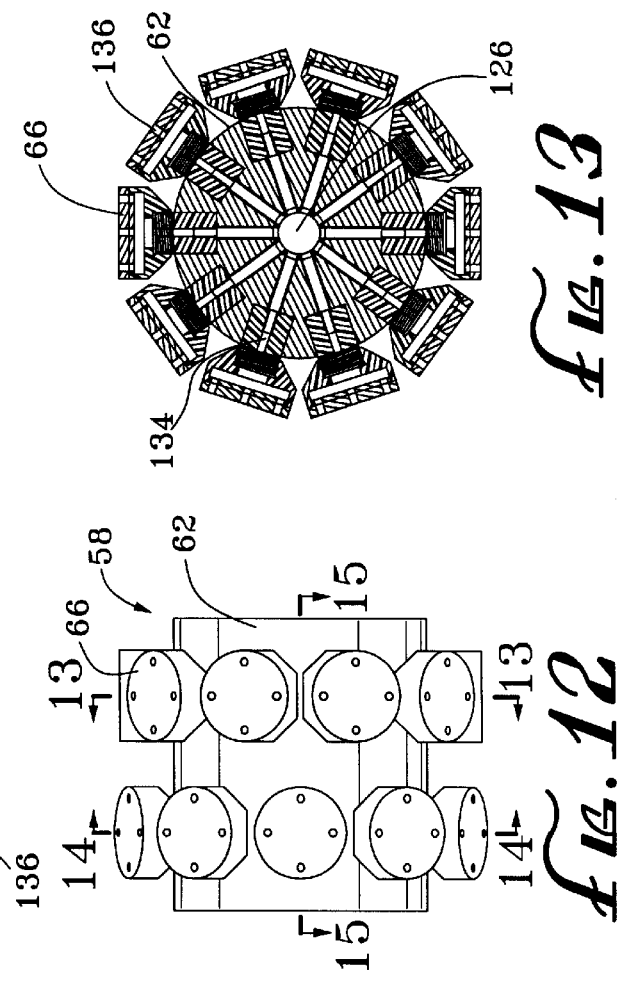
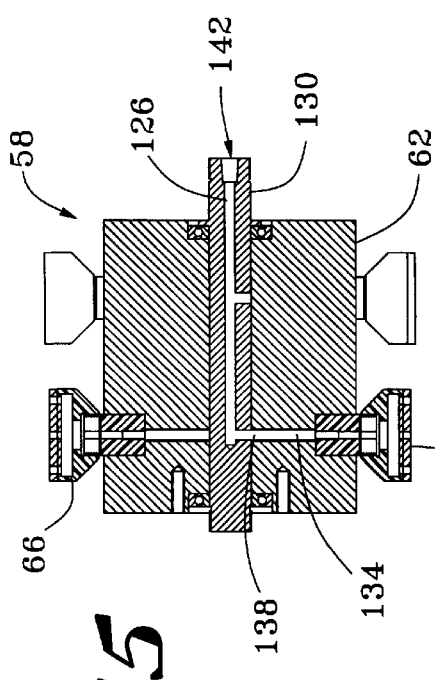
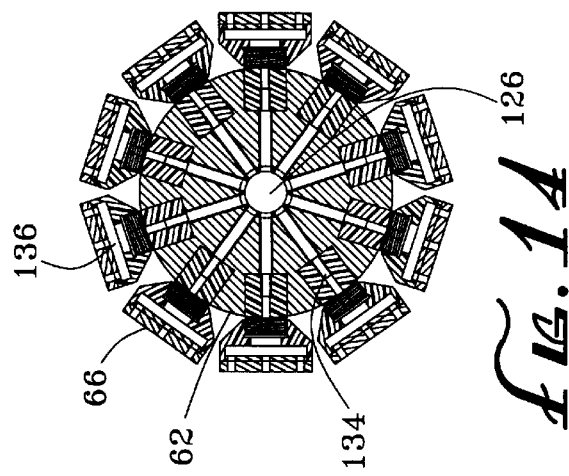

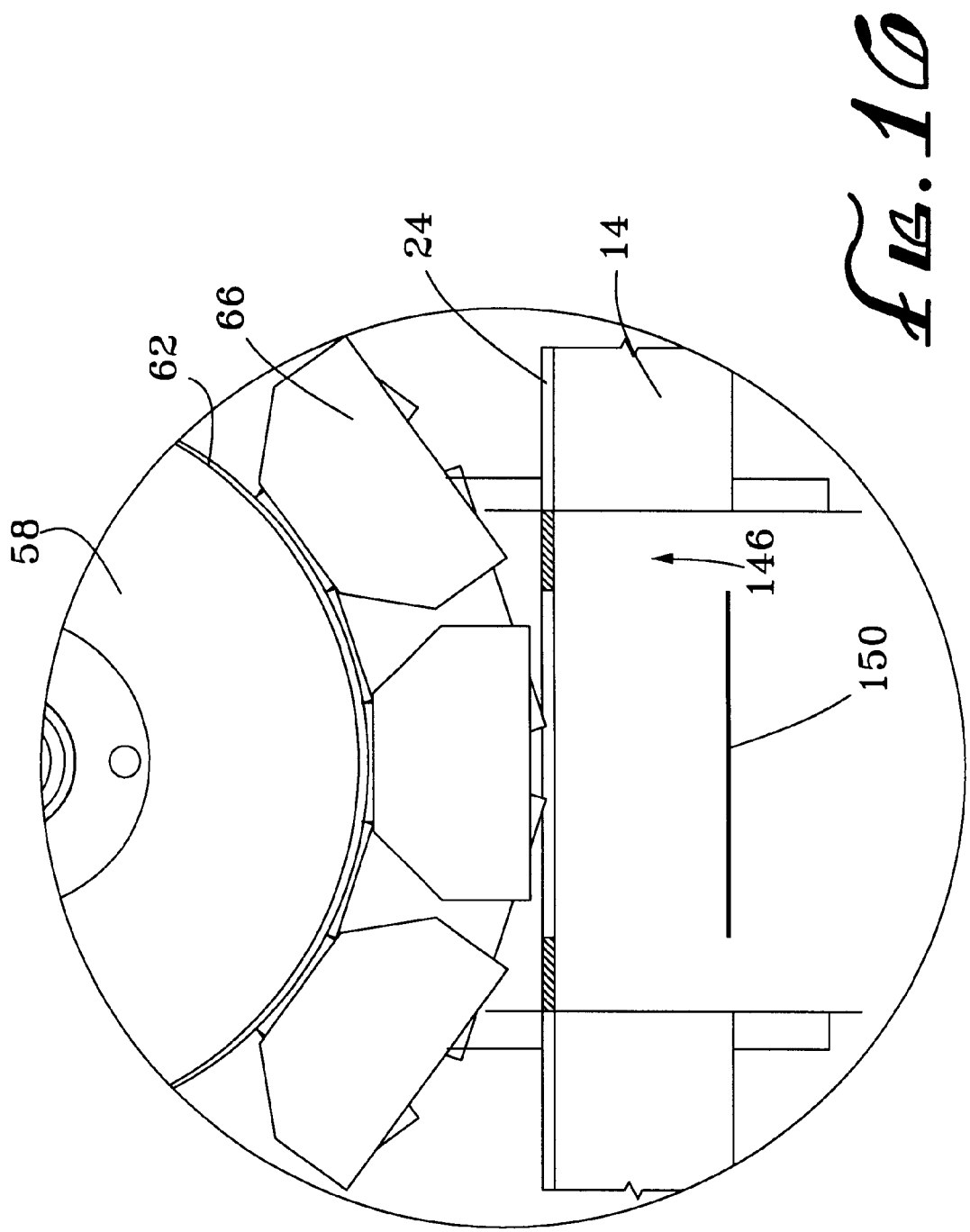

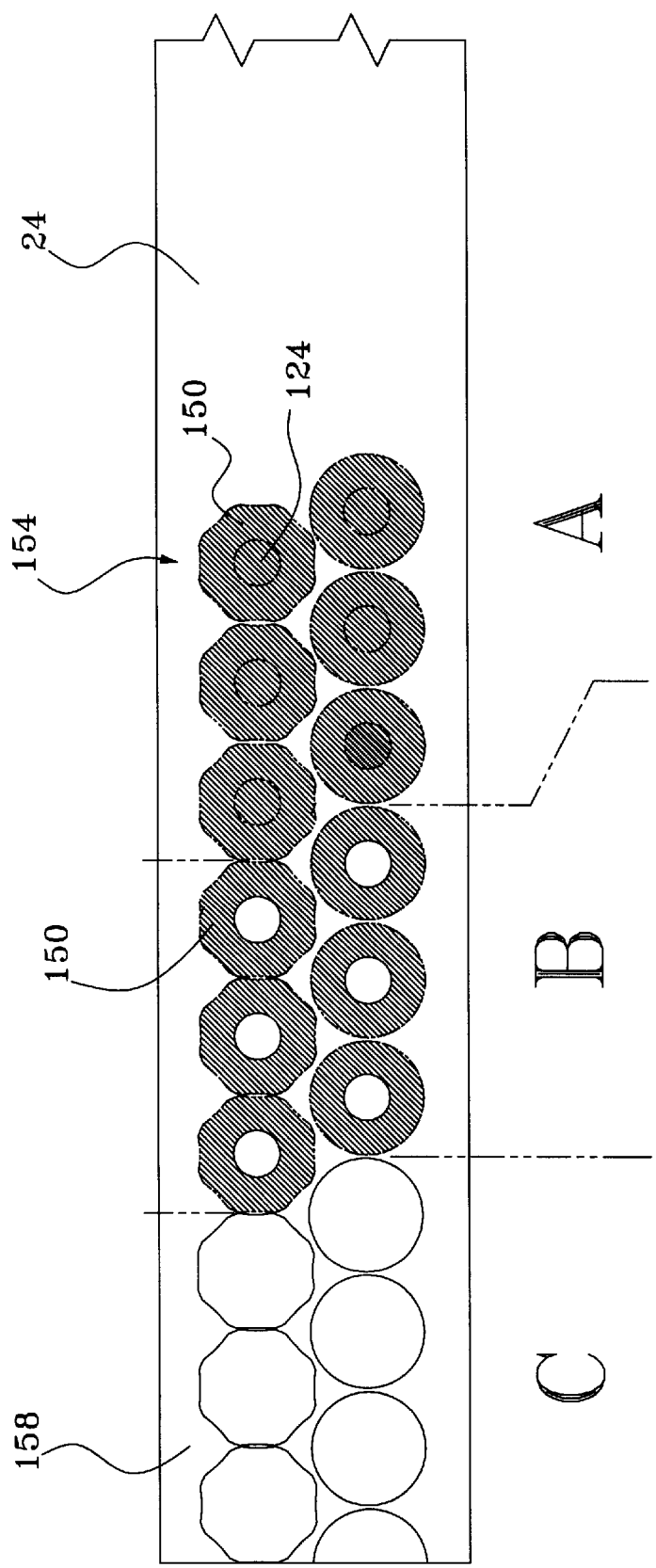

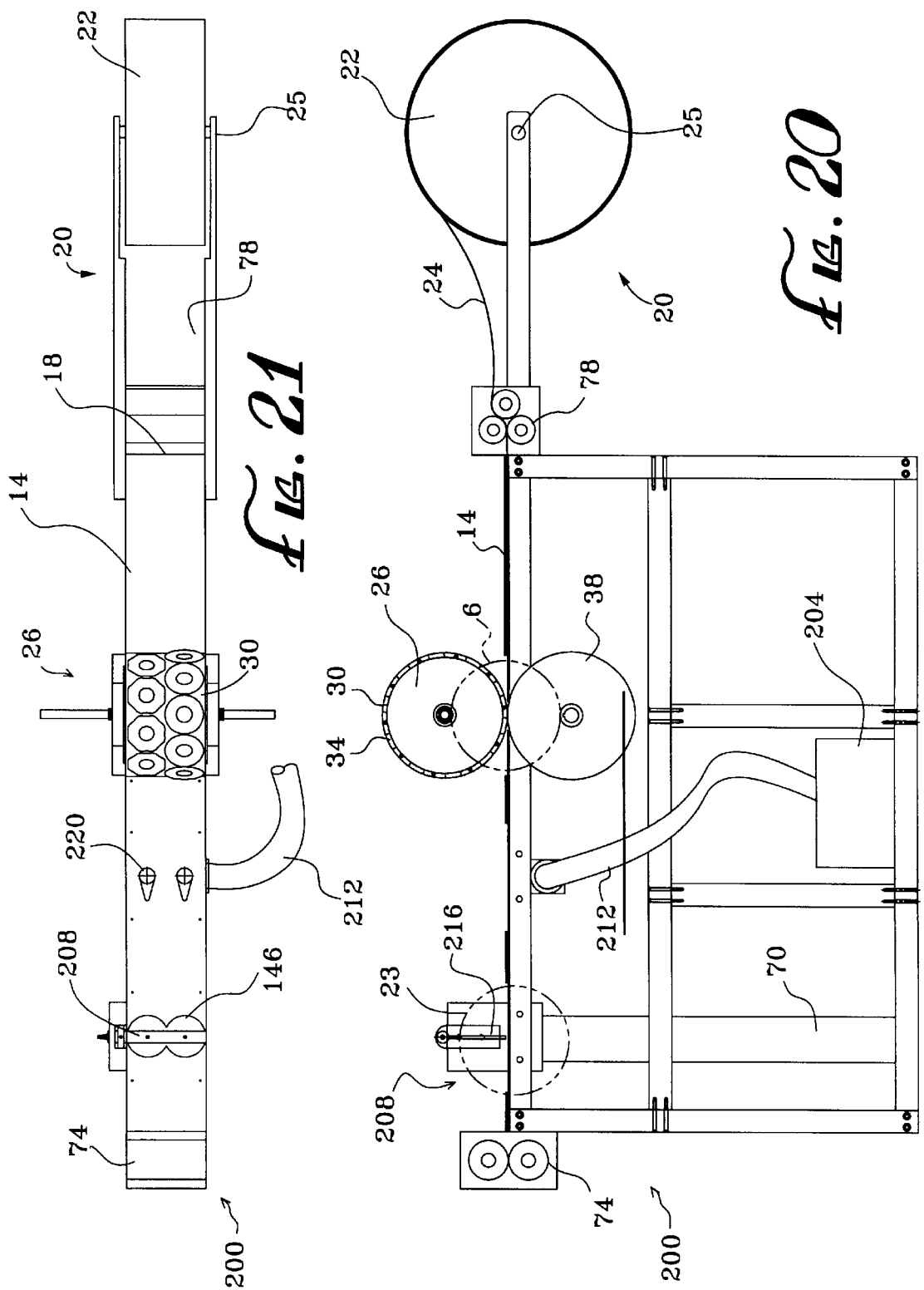

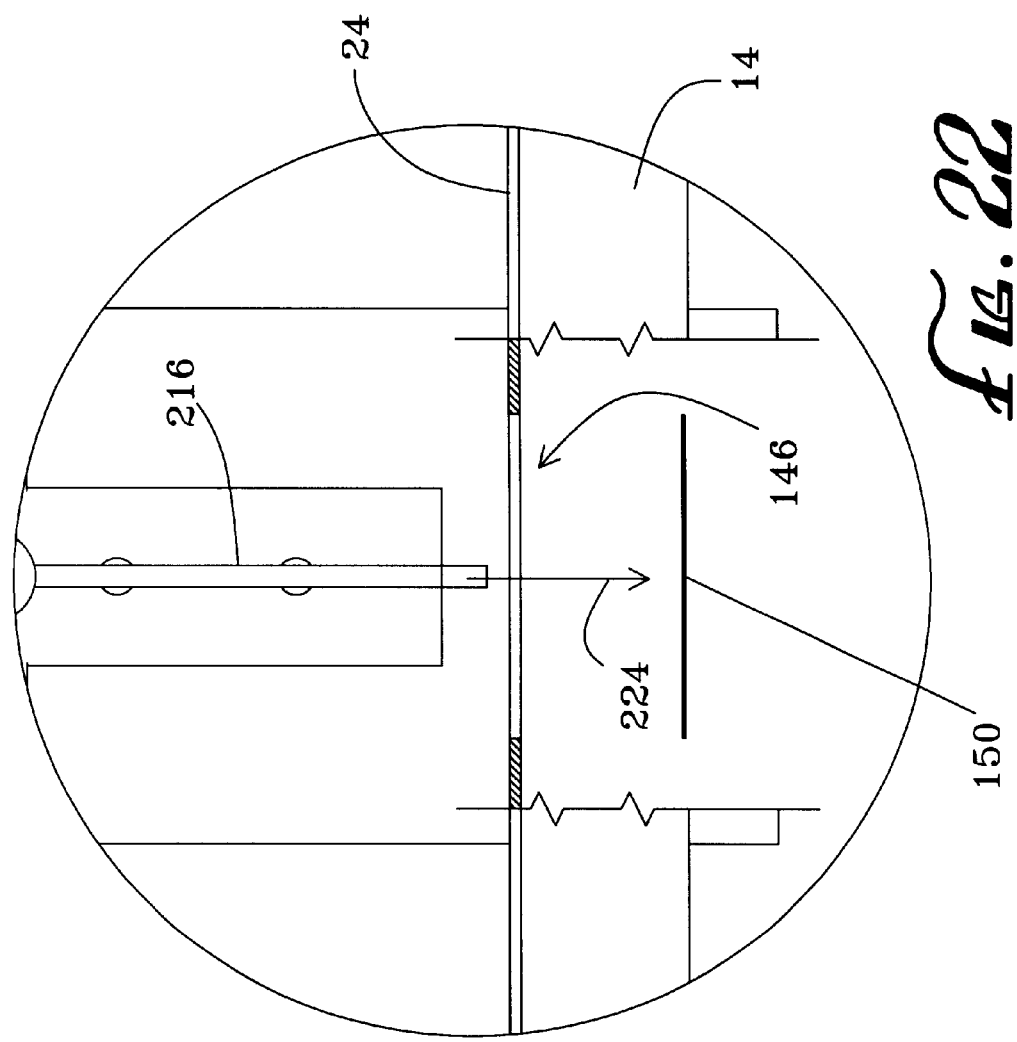

CONTINUOUS GASKET MAKING MACHINE AND METHOD

CROSS REFERENCE TO RELATED APPLICATION

The applicants claim the benefit of their prior provisional Application, Ser. No. 60/119,307, filed Feb. 8, 1999.

BACKGROUND OF THE INVENTION

The present invention relates to the field of gaskets and more particularly to the field of machines for making gaskets.

Gaskets are used to make pressure tight joints between stationary parts. Gaskets are made of thin deformable material, usually in the form of a ring. Typically, gaskets are made on punch presses. Dies are made, and fastened to the moveable jaw of the press. Then one or more layers of sheet stock are fed between the jaw and the bed of the machine. At each stroke of the press, gaskets are cut. After cutting, useable gaskets must be removed from the waste which consists of the center scrap and other left over material. In the batch process, one or more lengths of material at a time are fed into a press containing cutting dies. Then the gaskets must be separated from the scrap.

Since gasket making is a labor intensive, batch process, people have designed machines which will automatically produce gaskets and similar products. U.S. Pat. No. 2,692,020 discloses a portable die cutting and work feeding apparatus in which multiple layers of cloth with cardboard and a movable belt underneath and cutting dies on top, are laid out on a table. A portable platen press is moved to one end of the table. The assembly of cloth, etc. is moved under the platen and the press activated. Then the cut cloth is moved out from under the platen.

U.S. Pat. No. 3,701,275 discloses a machine for making spacer-expanders for piston oil rings. The machine comprises a punch press having a plurality of stations through which strip stock is fed progressively at accurately predetermined increments. The stations perform such operations as blanking, piercing bending, etc.

U.S. Pat. No. 3,801,406 discloses a method of making gaskets by producing a continuous strip of sheet stock, punching to form blanks, and vulcanizing under pressure.

U.S. Pat. No. 5,019,314 discloses a process for die cutting a sheet of thermoplastic material imprinted with data of limited spacial displacement in which the data is sequentially die cut in alternating rows and lines in a plurality of die cutting stations until all data has been cut with a residual attachment to the sheet.

U.S. Pat. No. 5,346,664 discloses an apparatus for forming a continuous ribbon of connected dish-shaped sequins. The apparatus includes a supply reel, a take-up reel, a punch and die set and a motor system to incrementally move material from the supply reel, through the punch and die set and onto the take-up reel.

U.S. Pat. No. 5,437,828 discloses a method of making photographic film spools involving continuously forming and punching out flanges and assembling them onto spool cores.

The disadvantages of these machines are that punching of the sheet must still be done flat in the equivalent of a punch press, the process must be carried out incrementally and not continuously, and such machines have many moving parts and are expensive to build and maintain. To truly streamline the process of making gaskets, and thus make gaskets more cheaply, a fully continuous process is needed. Development of a machine which can fabricate gaskets and similar parts truly continuously represents a great improvement in the field of machine design and satisfies a long felt need of the gasket maker and user.

SUMMARY OF THE INVENTION

The present invention is a machine for continuously making gaskets and similar flat products. Sheet gasket material is fed from a roll and through tooling that successively: rotatively cuts the outline, separates the center scrap, then separates the gaskets from the remaining sheet stock waste. Design and fabrication of such a machine, especially the cutting roller, is made possible by state of the art CAD software. The advantage of this machine is that it produces gaskets continuously rather than by the standard batch process thus making fabrication cheaper. Removal of the center scrap may be accomplished by rotating tooling or vacuum. Removal of the gaskets may be accomplished by rotating tooling or forced air.

An appreciation of the other aims and objectives of the present invention and an understanding of it may be achieved by referring to the accompanying drawings and description of a preferred embodiment.

BRIEF DESCRIPTION OF THE DRAWINGS

FIG. 1 is a side elevation view of this invention. For the sake of clarity much of the supporting structure is not illustrated.

FIG. 2 is a top view of this invention. For the sake of clarity much of the supporting structure is not illustrated.

FIG. 3 is a top view of the cutting roller.

FIG. 4 is a cross section along the lines 4—4 of FIG. 3.

FIG. 5 is a cross section along the lines 5—5 of FIG. 3.

FIG. 6 is an enlarged view of area 6 on FIG. 1 and FIG. 20.

FIG. 7 is a top view of the center hole punching roller.

FIG. 8 is a cross section along the lines 8—8 of FIG. 7.

FIG. 9 is a cross section along the lines 9—9 of FIG. 7.

FIG. 10 is a cross section along the lines 10—10 of FIG. 7.

FIG. 11 is an enlarged view of area 11 on FIG. 1.

FIG. 12 is a top view of the gasket punching roller.

FIG. 13 is a cross section along the lines 13—13 of FIG. 12.

FIG. 14 is a cross section along the lines 14—14 of FIG. 12.

FIG. 15 is a cross section along the lines 15—15 of FIG. 12.

FIG. 16 is an enlarged view of area 16 on FIG. 1.

FIG. 17 is a top view of gasket material as it is being successively cut and punched by this invention.

FIG. 20 is a side elevation view of an alternate embodiment of this invention. For the sake of clarity much of the supporting structure is not illustrated.

FIG. 21 is a top view of the alternate embodiment of this invention illustrated in FIG. 20. For the sake of clarity much of the supporting structure is not illustrated.

FIG. 22 is an enlarged view of area 23 on FIG. 20.

DETAILED DESCRIPTION OF THE PREFERRED EMBODIMENT

Figures 18, 19:
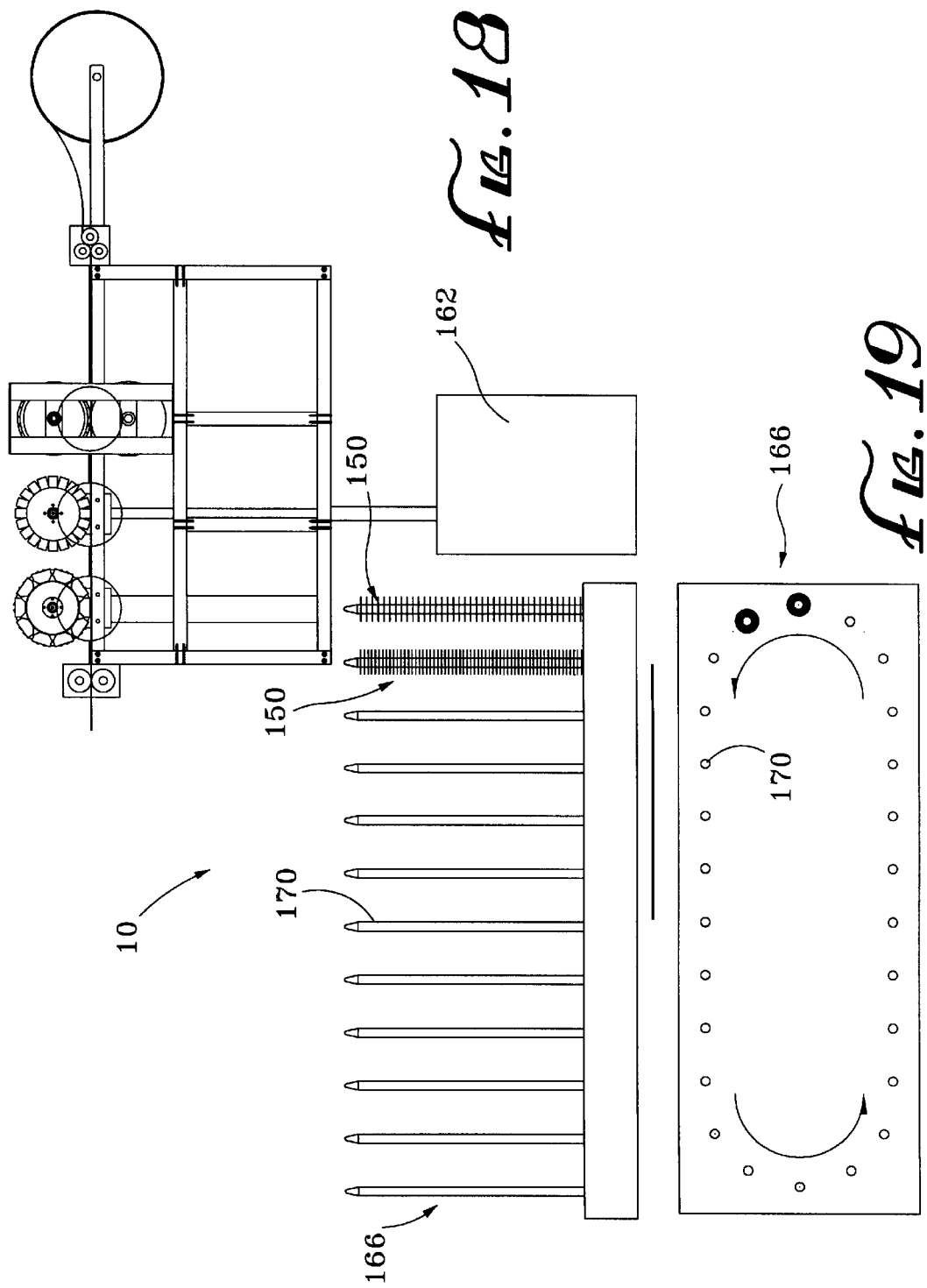
FIG. 18 is a side elevation view of an embodiment of this invention which includes a center scrap collecting bin and a part collecting carrousel.
FIG. 19 is a top view of the part collecting carrousel shown in FIG. 18.

FIGS. 1 and 2 represent side and top views of this invention 10. The machine 10 has a feed bed 14. The feed bed 14 is preferably made out of 4130 steel, normalized and precision ground with a hard chrome finish. At one end 18 of the bed 14 is located a holder 20 for a roll 22 of gasket material 24. Rolls 22 of gasket material 24 are commercially available. Preferably, the axle 25, holding this roll 22 is in line with the feed bed 14. Next to the material feed roller 22 is a cutting roller 26. This roller 26 is mounted over the feed bed 14. Preferably this 26 roller is made out of 6061-T6 aluminum. On the circumference 30 of this roller 26 are mounted cutters 34, which are radially compensated. This means that the cutters 34 are designed so that they will cut out flat articles of true dimension even though the cutters 34 themselves are curved to fit on the circumference 30 of the roller 26. Preferably, the cutters 34 are made of D-2 tool steel hardened to $R_c$ 58-60. The cutters 34 cut out the outlines of the gaskets, which will be produced on the machine 10. As will be further described below, the outline includes the periphery of the gasket and the center hole. The outline may also include the mounting holes. Alternatively, mounting holes may be cut in a subsequent operation.

A receiving roller 38 is mounted under and in vertical alignment with the cutting roller 26. Preferably, the receiving roller 38 is made out of D-2 tool steel hardened to $R_c$ 58-60 with a thermally diffused vanadium carbide surface. The receiving roller 38 can be re-ground and replaced, thus saving wear and tear on the bed 14 from continuous action of the cutters 34.

Next to the cutting roller 26 is a center scrap removing roller 42, which is mounted over the feed bed 14. Preferably this roller 42 is made of 6061-T6 aluminum. On the circumference 46 of the center scrap removing roller 42 are mounted cylindrical punches 50. Preferably the punches 50 are made of 101 Nylon®. The cross sections of the punches 50 are the same shape as the center opening and, if cut, the mounting holes of the gasket. The roller 42 and punches 50 are fed with compressed air to assist in removal of the center scrap from the gasket material 24. The air supply is described in more detail below. Under the feed bed 14, in alignment with the vertical cylindrical punch 50, is located a center scrap receiver 54. The receiver 54 can be a container of cross section slightly larger than the center scrap. Consequently, as the center scrap removing roller 42 rotates, the punches 50 punch out the centers and, if cut, the mounting hole scraps from the gaskets. The center and mounting hole scraps are then collected in the receiver 54. When the receiver 54 is full, it is replaced with an empty one.

Next to the center scrap removing roller 42 is a gasket removing roller 58, which is mounted over the feed bed 14. Preferably this roller 58 is made of 6061-T6 aluminum. On the circumference 62 of the part removing roller 58 are mounted annular punches 66. Preferably, these punches 66 are made of 101 Nylon®. The cross sections of these punches 66 are the same shape as the gaskets. The punch 66 and roller 58 combination is designed so that as the roller 58 rotates, the end of the punch 66 moves to just below the back of material 24. The roller 58 and punches 66 are fed with compressed air to assist in removal of the gaskets from the gasket material 24. The air supply is described in more detail below. Under the feed bed 14, in alignment with the vertical annular punch 66, a part receiver 70 is located. This receiver 70 is again a container of cross section slightly larger in all dimensions that the size of the gasket. Consequently, as the gasket removing roller 58 rotates, the punches 66 punch out the gaskets and the gaskets are collected in this receiver 70. When this receiver 70 is full, it is also replaced with an empty one. The remaining material 24, which has not been punched out and collected, rolls off the end of the feed bed 14 and is collected by any convenient means. Typically this means would be a cutter 74 and bin (not illustrated).

The machine 10 is driven by any convenient power source connected to the rollers 26, 38, 42, 58 by any convenient means. For example, the machine 10 could be powered by a single phase 120v motor connected to the rollers 26, 38, 42, 58 by timing belts. The machine 10 may be designed and built with other rollers, for example a stock straightening roller 78, at various locations in order to maintain tension and keep the gasket material 24 flat as it passes through the machine 10. Exact locations, adjustment, etc. of such rollers will be apparent to those most familiar with the art to which this invention pertains.

Recently available CAD tooling has made design and manufacture of radially compensated tooling possible. Briefly, the procedure is to design the cutter 34 flat on a computer using one of many available CAD programs and then instruct the computer to curve the base of the cutter 34 to match the surface 30 of the roller 26. The software then takes care of translating the design so that dimensions and angular relationships are properly maintained. In this way, after the cutter 34 is produced and used, it will cut articles of true dimension even though curved.

FIGS. 3, 4 and 5 provide further details about the design and construction of the cutting roller 26. Each gasket cutter 34 consists of an inner cutter 82, which is the shape of the center hole, and an outer cutter 86, which is the shape of the outer perimeter of the gasket. As illustrated on FIG. 3, two or more different gasket designs could be cut at one time. In this case, for most efficient use of material, the gasket cutters should be staggered. Although not illustrated, it will be obvious to those who are most familiar with the art to which this invention pertains, that mounting holes can be cut in a similar manner.

FIG. 6 is an enlarged view of the cutting roller 26 in operation. There is an opening 90 of the appropriate size in the feed bed 14 vertically below the cutting roller 26. The cutters 34 meet the receiving roller 38 tangentially through this opening 90. The space between the receiving roller 38 and the cutting roller 26 is adjusted so that the gasket material 24 is gripped with the proper tension and so that the cutters 34 will cut completely through the gasket material 24. As the material 24 is fed under the cutters 34, the outer perimeter and center hole of the gasket are cut out. Staggering of the cutters 34, helps feed the material 24 smoothly between the rollers 26, 38.

FIGS. 7, 8 and 9 provide more details about the design and construction of the center hole punching roller 42. Each punch 50 is the shape of the center hole of the gasket. If the cutting roller 26 is designed to cut two or more gaskets with staggered cutters 34, the punches 50 will be of different shapes and similarly staggered. Also, if mounting holes are cut at the cutting roller 26, punches for punching out the mounting holes (not illustrated) will also be provided on this roller 42.

FIGS. 8, 9 and 10 provide details of the air assist system. One channel 94 is provided through the axle 98 of the roller 42. A second channel 102 runs radially through the roller 42 and to the end 106 of each punch 50. The axle channel 94 has one or two exit holes 110, depending on how many rows of punches 50 there are, pointing vertically downwards. The holes 110 line up with each radial channel 102 once each revolution. Compressed air is fed into the entrance 114 to the axial channel 94. In this way, as the roller 42 rotates, compressed air is only fed to the active punch 50, i.e. the punch 50 that is vertical and presently punching out the center hole scrap.

FIG. 11 is an enlarged view of the center hole punching roller 42 in operation. There is an opening 118 of the appropriate size in the feed bed 14 vertically below the roller 42. The roller 42 is adjusted so that the end 106 of the vertical punch 50 just passes through the material 24 through this opening 118. As the material 24 is fed under the roller 42, the center hole scrap 122 is pushed out by the combined action of the punch 50 and air pressure. Staggering of the punches 50, helps feed the material 24 smoothly under the roller 42.

FIGS. 12, 13 and 14 provide more details about the design and construction of the gasket punching roller 58. Each punch 66 is the shape of the gasket. If the cutting roller 26 is designed to cut two or more gaskets with staggered cutters 34, the punches 66 will be of different shapes and similarly staggered.

FIGS. 13, 14 and 15 provide details of the air assist system. One channel 126 is provided through the axle 130 of the roller 58. A second channel 134 runs radially through the roller 58 and to the end 136 of each punch 66. The axle channel 126 has one or two exit holes 138, depending on how many rows of punches 66 there are, pointing vertically downwards. The holes 138 line up with each radial channel 134 once each revolution. Compressed air is fed into the entrance 114 to the axial channel 94. In this way, as the roller 58 rotates, compressed air is only fed to the active punch 66, i.e. the punch 66 that is vertical and presently punching out the gasket.

FIG. 16 is an enlarged view of the gasket punching roller 58 in operation. There is an opening 146 of the appropriate size in the feed bed 14 vertically below the roller 58. The roller 58 is adjusted so that the vertical punch 66 just passes through the material 24 through this opening 146. As the material 24 is fed under the roller 58, the gasket 150 is punched out by the combined action of the punch 66 and air pressure. Staggering of the punches 66, helps feed the material 24 smoothly under the roller 58.

FIG. 17 is a top view of gasket material 24 as it is being successively cut and punched by this invention 10. To use this machine, referring again to FIG. 1, the following steps are followed. A roll 22 of gasket material 24 is mounted onto the holder 20. The material 24 feeds through the machine 10 along the feed bed 14. As the material 24 passes between the cutting roller 26 and the receiving roller 38, the pattern 154 of the gasket 150 and its center hole 124 is cut. This is illustrated at area A on FIG. 17. As the material 24 passes between the center scrap removing roller 42 and the center scrap receiver 54, the center hole scrap 122 is punched out. This is illustrated at area B on FIG. 17. As the material 24 passes between the gasket removing roller 58 and the gasket receiver 70, the finally formed gasket 150 is punched out. This is illustrated at area C on FIG. 17. Consequently, when the machine 10 is actuated, all the rollers 22, 26, 42, 58 turn and the machine 10 continuously: cuts a gasket outline 154 into the material 24, punches out the center scrap 122 into a receiver 54, punches out the gaskets 150 into a receiver 70 and collects the left over material 158. The left over material 158 is illustrated at area C on FIG. 17. The gaskets 150 and scrap 122, 158 are separately collected. The gaskets 150 are used in specific engineered applications, and the scrap 122, 158 is discarded or returned to be re-ground and used in the manufacture of further gasket material 24.

FIG. 18 is a side elevation view of an embodiment of this invention 10 which includes a center scrap collecting bin 162 and a part collecting carrousel 166. FIG. 19 is a top view of the part collecting carrousel 166 shown in FIG. 18. The bin 162 can be of any convenient size and shape. The collected center scrap 122 can be compressed before it is discarded or remanufactured.

The carrousel 166 has a series of rods 170 of diameter smaller than the center hole 124 of the completed gasket 150. One of the rods 170 is positioned directly under the gasket receiver 70. Then as the gaskets 150 fall out of the machine 10 they are collected on the rod 170. As each rod 170 "fills up" with gaskets 150, a second rod 170 is rotated under the receiver 70 by any convenient mechanism (not illustrated). The rods 170 are removable and function as convenient means for collecting, storing and transporting the gaskets 150.

FIGS. 20 and 21 are side and top views of an alternate embodiment 200 of this invention. For the sake of clarity much of the supporting structure is not illustrated. The alternate embodiment 200 is essentially the same as the primary embodiment 10 described above and works in a similar manner. The differences are: 1) the center hole punching roller 42 is replaced by a vacuum system 204 and 2) the gasket punch 66 is replaced by a forced air system 208. A vacuum hose or tube 212 connects the vacuum system 204 with the second holes 220 through the feed bed 14. Note that the second holes 220 are teardrop shaped to facilitate removal of the center hole scrap 122. The forced air system 208 ends with tubes 216 directed approximately to the centers of the third holes 146 through the feed bed 14. As the material 24 is fed over the feed bed 14, the center hole scrap 122 is sucked down into the vacuum system 204 for later removal and disposal and the gasket 150 is blown down by the forced air into the gasket receiver 70.

FIG. 22 is an enlarged view of area 23 on FIG. 20. There is an opening 146 of the appropriate size in the feed bed 14. A tube 216 directs compressed air 224 downwards approximately through the center of the opening 146. As the material 24 is fed under the tube 216, the gasket 150 is pushed out by air pressure.

The following reference numerals are used on FIGS. 1 through 22.
10 Continuous gasket making machine
14 Feedbed
18 End of feed bed
20 Holder for roll of gasket material
22 Roll of gasket material
24 Gasket material
25 Axle of roll of gasket material
26 Cutting roller
30 Circumference of cutting roller
34 Cutter
38 Receiving roller
42 Center hole punching roller
46 Circumference of center hole punching roller
50 Center hole punch
54 Receiver for center hole scrap
58 Gasket punching roller
62 Circumference of gasket punching roller
66 Gasket punch
70 Gasket receiver
74 Left over material cutter
78 Material straightening roller
82 Inner cutter
86 Outer cutter
90 First opening through feed bed
94 Channel through axle of center hole punching roller
98 Axle of center hole punching roller 102 Radial channel through center hole punching roller and center hole punch
106 End of center hole punch
110 Vertical communication hole between axial and radial channels in center hole punching roller
114 Entrance to axial channel in center hole punching roller
118 Second opening through feed bed
122 Center hole scrap
124 Center hole of gasket
126 Channel through axle of gasket punching roller
130 Axle of gasket punching roller
134 Radial channel through gasket punching roller and gasket punch
136 End of gasket punch
138 Vertical communication hole between axial and radial channels in gasket punching roller
142 Entrance to axial channel in gasket punching roller
146 Third opening through feed bed
150 Gasket
154 Gasket outline
158 Left over material scrap
162 Center scrap collection bin
166 Gasket collecting carrousel
170 Rod
200 Alternate embodiment of continuous gasket making machine
204 Vacuum system
208 Forced air system
212 Vacuum hose or tube
216 Forced air directing tube
220 Teardrop shaped second opening through feedbed
224 Direction of air flow The continuous gasket making machine has been described with reference to several embodiments 10, 200. Other modifications and enhancements can be made without the spirit and scope of the claims that follow.

What is claimed is:

1. A continuous gasket making machine comprising:
   a. a feed bed adapted to receive a moving web of gasket material; said feed bed having a first opening a second opening and a third opening therethrough; said openings being spaced apart from each other;
   b. gasket material unrolling means for removing rolled gasket material from a roll, flattening it and feeding it to said feed bed, mounted at one end of said feed bed;
   c. a cutting roller mounted over said first opening next to said gasket material unrolling means;
   d. a radially compensated cutter, mounted on the circumference of said cutting roller, designed to cut the outline of a gasket, including the center hole, into said gasket material as said roller rotates;
   e. a receiving roller mounted under said first opening so that said radially compensated cutter contacts said receiving roller tangentially;
   f. center scrap removing means for removing and collecting the center hole scrap, mounted adjacent said second opening next to said cutting roller;
   g. gasket removing means for removing and collecting said gasket, mounted adjacent said third opening next to said center scrap removing means; and
   h. means for powering said cutting roller, said center scrap removing means and said gasket removing means.

2. A continuous gasket making machine as claimed in claim 1 in which said cutter is also designed to cut the outline of the mounting hole and said center scrap removing means is also a means for removing mounting hole scrap.

3. A continuous gasket making machine as claimed in claim 1 in which said center scrap removing means comprises:
   a. a center scrap removing roller; and
   b. a center scrap removing punch mounted on the circumference of said center scrap removing roller designed to remove said center scrap as said center scrap removing roller rotates.

4. A continuous gasket making machine as claimed in claim 3 in which said center scrap removing means further comprises first air assist means, incorporated in said center scrap removing roller/center scrap removing punch combination, for assisting in removal of said center scrap from said web of gasket material.

5. A continuous gasket making machine as claimed in claim 1 in which said center scrap removing means comprises a vacuum system and a vacuum hose connecting said second opening to said vacuum system.

6. A continuous gasket making machine as claimed in claim 5 in which said second opening is teardrop shaped.

7. A continuous gasket making machine as claimed in claim 1 in which said gasket removing means comprises:
   a. a gasket removing roller; and
   b. a gasket removing punch mounted on the circumference of said gasket removing roller.

8. A continuous gasket making machine as claimed in claim 7 in which said gasket removing means further comprises second air assist means, incorporated in said gasket removing roller/gasket removing punch combination, for assisting in removal of said gasket from said gasket material.

9. A continuous gasket making machine as claimed in claim 1 in which said gasket removing means comprises a forced air system.

10. A continuous gasket making machine as claimed in claim 1 fuirther comprising a scrap cutting and collecting means for cutting and collecting left over gasket material, mounted at the end of said feed bed opposite said gasket material unrolling means.

11. A continuous gasket making machine as claimed in claim 1 further comprising:
    a. a removable gasket collecting means for collecting, storing and transporting said gasket; and
    b. a rotating and indexing means for moving said removable gasket collecting means to a position directly under said third opening and away from said position.

12. A continuous gasket making machine comprising:
    a. a feed bed adapted to receive a moving web of gasket material; said feed bed having a first opening a second opening and a third opening therethrough; said openings being spaced apart from each other;
    b. a holder for a roll of gasket material mounted at one end of said feed bed;
    c. a set of stock straightening rollers mounted next to said holder;
    d. a cutting roller mounted over said first opening next to said set of stock straightening rollers;
    e. a radially compensated cutter, mounted on the circumference of said cutting roller, designed to cut the outline of a gasket, including the center hole, into said web of gasket material as said cutting roller rotates;
    f. a receiving roller mounted under said first opening, so that said radially compensated cutter contacts said receiving roller tangentially;
    g. a center scrap removing roller mounted over said second opening next to said cutting roller;

h. a center scrap removing punch mounted on the circumference of said center scrap removing roller; said center scrap removing roller/center scrap removing punch combination designed and mounted so that said center scrap removing punch will punch out the center hole scrap from said web of gasket material as said center scrap removing roller rotates;

i. first air assist means, incorporated in said center scrap removing roller/center scrap removing punch combination, for assisting in removal of said center hole scrap from said web of gasket material;

j. a gasket removing roller mounted over said third opening next to said center scrap removing roller;

k. a gasket removing punch mounted on the circumference of said gasket removing roller; said gasket removing roller/gasket removing punch combination designed and mounted so that said gasket removing punch will punch out said gasket from said web of gasket material as said gasket removing roller rotates;

l. second air assist means, incorporated in said gasket removing roller/gasket removing punch combination, for assisting in removal of said gasket from said gasket material; and m. means for powering and making said rollers rotate in synchronization.

13. A continuous gasket making machine as claimed in claim 12 in which said cutter is also designed to cut the outline of the mounting hole and said center scrap removing punch is also designed to removing mounting hole scrap as said center scrap removing roller rotates.

14. A continuous gasket making machine as claimed in claim 12 further comprising a scrap cutting and collecting means for cutting and collecting left over gasket material, mounted at the end of said feed bed opposite said holder for a roll of gasket material.

15. A continuous gasket making machine as claimed in claim 12 further comprising:
  a. a removable rod adapted for collecting, storing and transporting said gasket; and
  b. a rotating and indexing mechanism for moving said removable rod to a position directly under said third opening and away from said position.

16. A continuous gasket making machine comprising:
  a. a feed bed adapted to receive a moving web of gasket material; said feed bed having a first opening a second opening and a third opening therethrough; said openings being spaced apart from each other; said second opening being teardrop shaped;
  b. a holder for a roll of gasket material mounted at one end of said feed bed;
  c. a set of stock straightening rollers mounted next to said holder;
  d. a cutting roller mounted over said first opening next to said set of stock straightening rollers;
  e. a radially compensated cutter, mounted on the circumference of said cutting roller, designed to cut the outline of a gasket, including the center hole, into said web of gasket material as said cutting roller rotates;
  f. a receiving roller mounted under said first opening, so that said radially compensated cutter contacts said receiving roller tangentially;
  g. a vacuum system;
  h. a vacuum hose of diameter sufficient to accept center hole scrap, connecting said vacuum system to the underside of said second opening; whereby center hole scrap is removed from said moving web of gasket material;
  i. a forced air system mounted over said third opening; said forced air system directing air into said third opening; whereby said gasket is removed from said web of gasket material; and
  j. means for powering said cutting roller.

17. A continuous gasket making machine as claimed in claim 16 in which said cutter is also designed to cut the outline of the mounting hole and said vacuum hose is also designed for removing mounting hole scrap; whereby mounting hole scrap is also removed from said moving web of gasket material.

18. A continuous gasket making machine as claimed in claim 16 further comprising a scrap cutting and collecting means for cutting and collecting left over gasket material, mounted at the end of said feed bed opposite said holder for a roll of gasket material.

19. A continuous gasket making machine as claimed in claim 16 further comprising:
  a. a removable rod adapted for collecting, storing and transporting said gasket; and
  b. a rotating and indexing mechanism for moving said removable rod to a position directly under said third opening and away from said position.

20. A method of continuously fabricating gaskets comprising the steps of:
  a. providing a machine comprising
    i. a feed bed adapted to receive a moving web of gasket material; said feed bed having a first opening a second opening and a third opening therethrough; said openings being spaced apart from each other;
    ii. a holder for a roll of gasket material mounted at one end of said feed bed;
    iii. a set of stock straightening rollers mounted next to said holder;
    iv. a cutting roller mounted over said first opening next to said set of stock straightening rollers;
    v. a radially compensated cutter, mounted on the circumference of said cutting roller, designed to cut the outline of a gasket, including the center hole, into said web of gasket material as said cutting roller rotates;
    vi. a receiving roller mounted under said first opening, so that said radially compensated cutter contacts said receiving roller tangentially;
    vii. a center scrap removing roller mounted over said second opening next to said cutting roller;
    viii. a center scrap removing punch mounted on the circumference of said center scrap removing roller; said center scrap removing roller/center scrap removing punch combination designed and mounted so that said center scrap removing punch will punch out said center hole scrap from said web of gasket material as said center scrap removing roller rotates;
    ix. first air assist means, incorporated in said center scrap removing roller/center scrap removing punch combination, for assisting in removal of said center hole scrap from said web of gasket material;
    x. a gasket removing roller mounted over said third opening next to said center scrap removing roller;
    xi. a gasket removing punch mounted on the circumference of said gasket removing roller; said gasket removing roller/gasket removing punch combination designed and mounted so that said gasket removing punch will punch out said gasket from said web of gasket material as said gasket removing roller rotates;

xii. second air assist means, incorporated in said gasket removing roller and gasket removing punch combination, for assisting in removal of said gasket from said gasket material;

xiii. means for powering and making said rollers rotate in synchronization;

xiv. a scrap cutting and collecting means for cutting and collecting left over gasket material, mounted at the end of said feed bed opposite said holder for a roll of gasket material;

xv. a removable rod adapted for collecting, storing and transporting said gasket; and xvi. a rotating and indexing mechanism for moving said removable rod to a position directly under said third opening and away from said position;

b. mounting a roll of gasket material onto said holder;

c. feeding said gasket material through said machine along said feed bed;

d. actuating said machine;

e. collecting gaskets produced by said machine; and f. separately collecting center hole scrap and left over gasket material produced by said machine.

21. A method of continuously fabricating gaskets as claimed in claim 20 in which said cutter is also designed to cut the outline of the mounting hole and said center scrap removing punch is also designed to remove mounting hole scrap as said center scrap removing roller rotates fuirther comprising the step of collecting said mounting hole scrap with said center hole scrap.

22. A method of continuously fabricating gaskets comprising the steps of;

a. providing a machine comprising:

i. a feed bed adapted to receive a moving web of gasket material; said feed bed having a first opening a second opening and a third opening therethrough;

said openings being spaced apart from each other; said second opening being teardrop shaped;

ii. a holder for a roll of gasket material mounted at one end of said feed bed;

iii. a set of stock straightening rollers mounted next to said holder;

iv. a cutting roller mounted over said first opening next to said set of stock straightening rollers;

v. a radially compensated cutter, mounted on the circumference of said cutting roller, designed to cut the outline of a gasket, including the center hole, into said web of gasket material as said cutting roller rotates;

vi. a receiving roller mounted under said first opening, so t hat said radially compensated cutter contacts said receiving roller tangentially;

vii. a vacuum system;

viii. a vacuum hose of diameter sufficient to accept center hole scrap, connecting said vacuum system to the underside of said second opening; whereby center hole scrap is removed from said moving web of gasket material;

ix. a forced air system mounted over said third opening next to said center scrap removing roller; said forced air system directing air into said third opening; whereby said gasket is removed from said web of gasket material; and x. means for powering said cutting roller;

b. mounting a roll of gasket material onto said holder;

c. feeding said gasket material through said machine along said feed bed;

d. actuating said machine;

e. collecting gaskets produced by said machine; and f. separately collecting center hole scrap and left over gasket material produced by said machine.

23. A method of continuously fabricating gaskets as claimed in claim 22 in which said cutter is also designed to cut the outline of the mounting hole and said vacuum hose is also designed for removing mounting hole scrap further comprising the step of collecting said mounting hole scrap with said center hole scrap; whereby mounting hole scrap is also removed from said moving web of gasket material.

24. A method of continuously fabricating gaskets comprising the steps of:

a. providing a roll of a gasket material;

b. unwinding said gasket material from said roll;

c. flattening said unwound gasket material;

d. passing said gasket material between a cutting roller and a receiving roller; said cutting roller provided with a radially compensated cutter mounted on its circumference; said cutting roller/cutter combination designed and mounted to cut a gasket outline as said cutting roller rotates; said gasket outline including the center hole; said outline of said center hole defining a center hole scrape e. passing said gasket material through a center scrap removing means for removing and collecting the center hole scrap;

f. passing said gasket material through a gasket removing means for removing and collecting the gasket;

g. collecting said gasket; and h. separately collecting the center hole scrap and left over gasket material.

25. A method of continuously fabricating gaskets as claimed in claim 24 in which said cutter is also designed to cut the outline of the mounting hole and said center scrap removing means is also designed to remove mounting hole scrap further comprising the step of collecting said mounting hole scrap with said center hole scrap.

26. A method of continuously fabricating gaskets as claimed in claim 24 further comprising the step of cutting said left over gasket material prior to collection.

* * * * *